H. B. SPERRY.
SHEAF CARRIER.
APPLICATION FILED MAY 11, 1914.
1,200,042.
Patented Oct. 3, 1916.
4 SHEETS—SHEET 2.
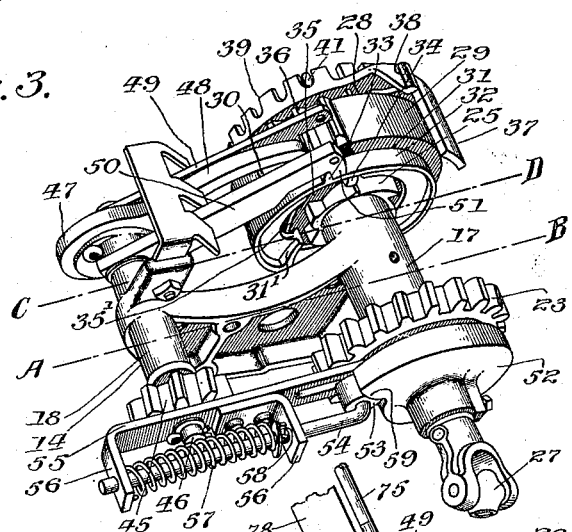
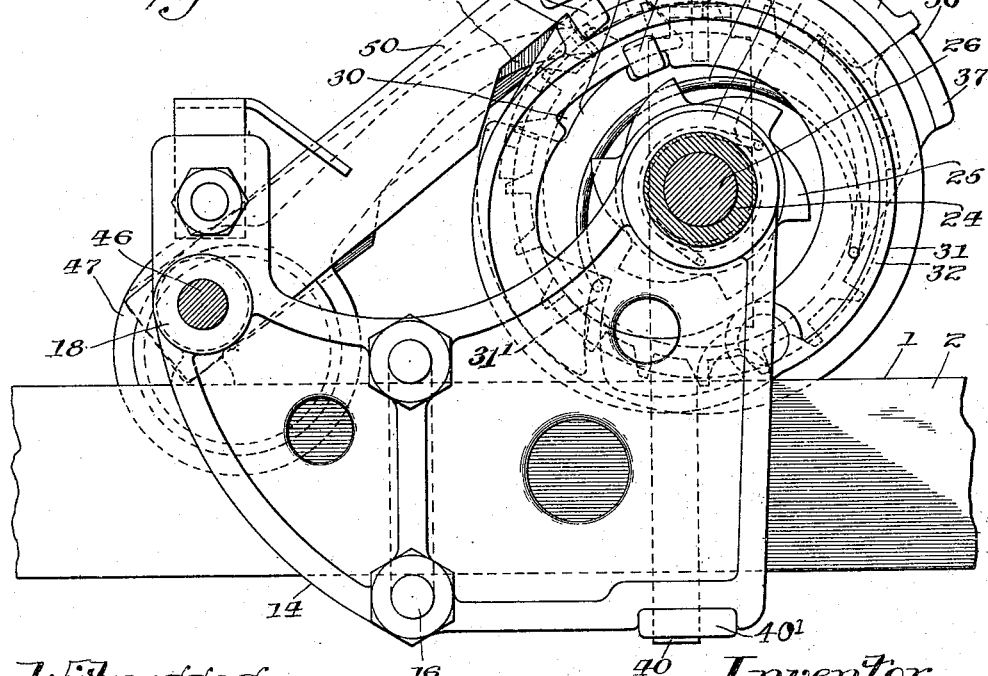
Witnesses:
C. C. Palmer
E. W. Burgess
Inventor.
Herbert B. Sperry,
By Chas. E. Lord
Atty.

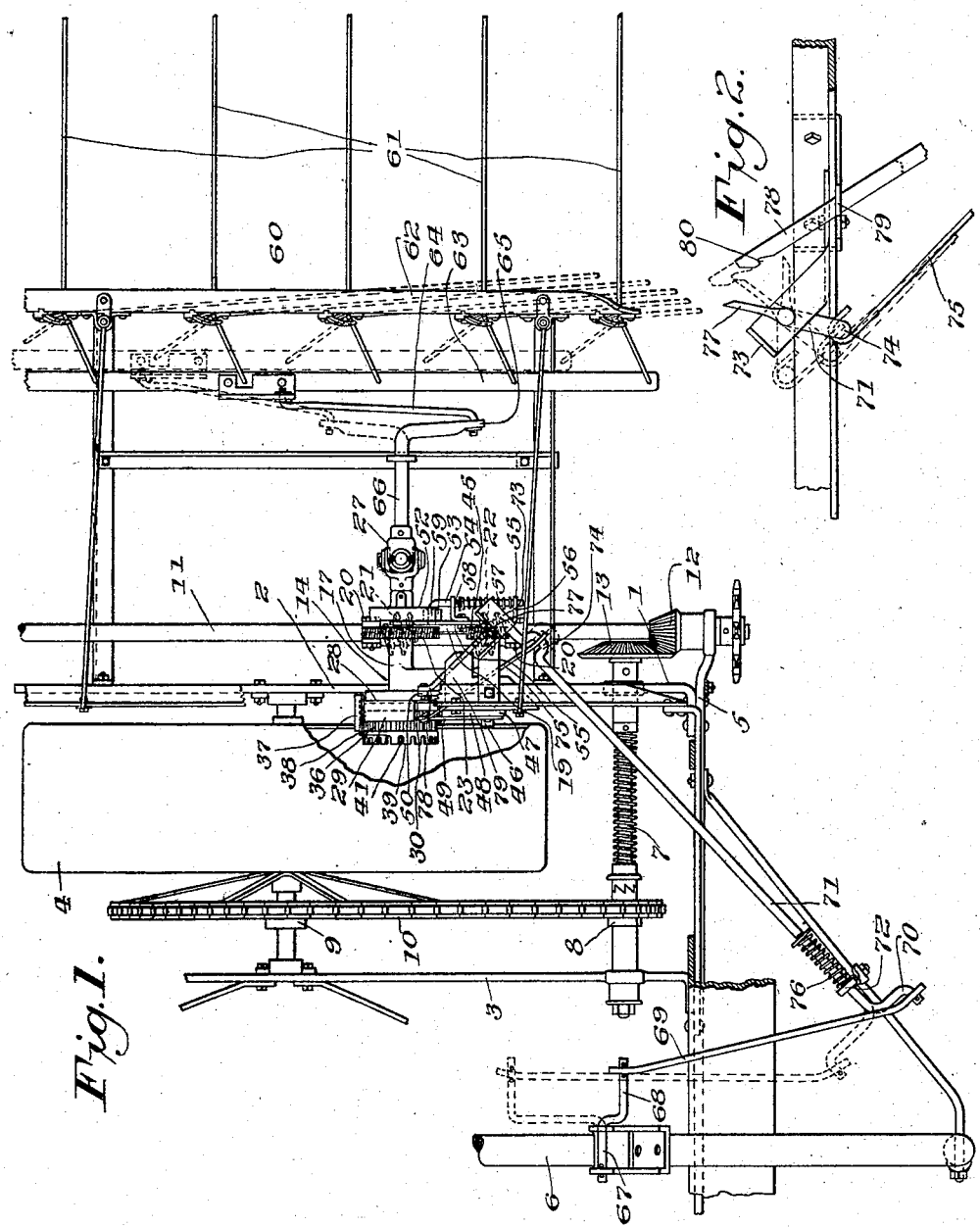

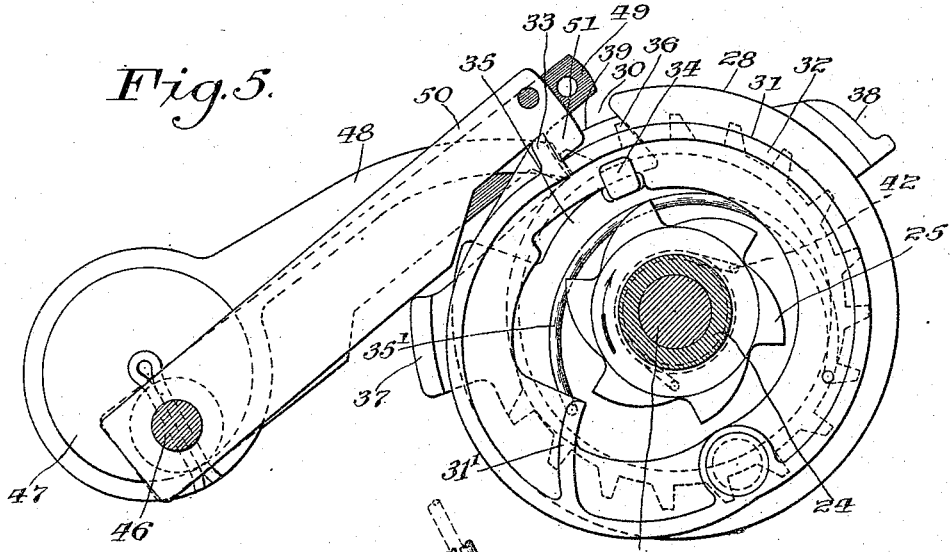
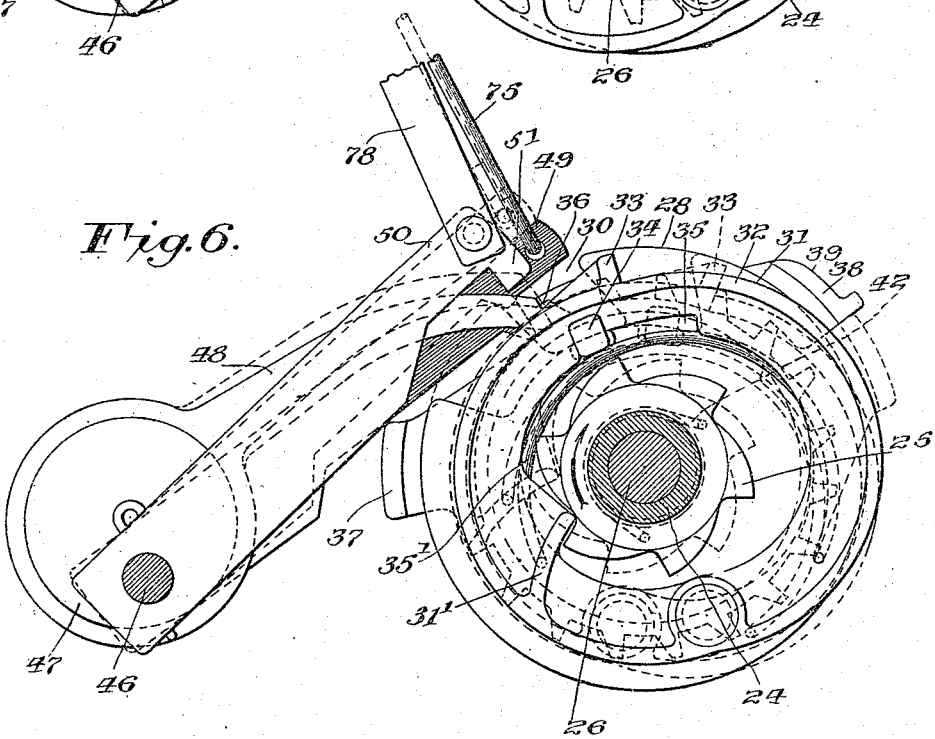

H. B. SPERRY.
SHEAF CARRIER.
APPLICATION FILED MAY 11, 1914.
1,200,042.
Patented Oct. 3, 1916.
4 SHEETS—SHEET 4.
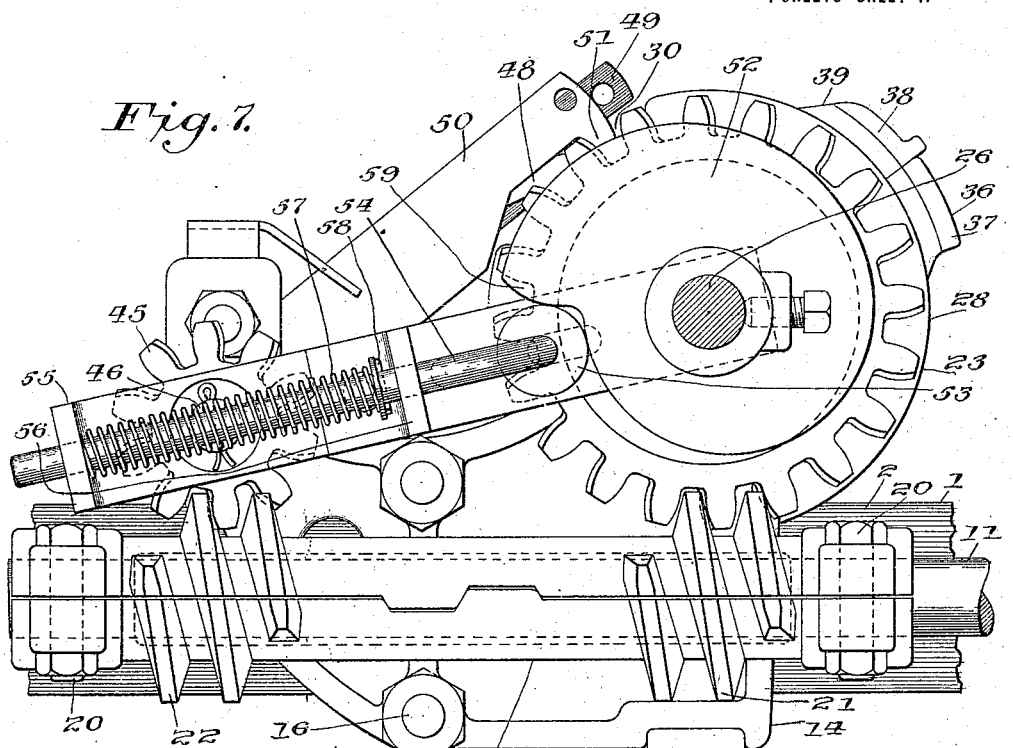
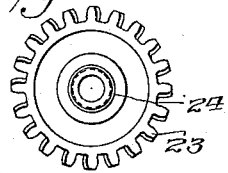
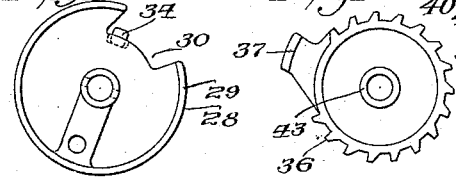
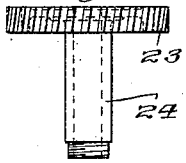
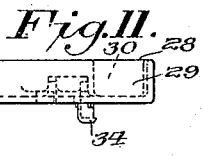
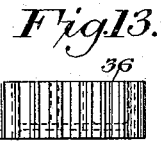
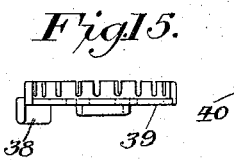
Witnesses:
C. C. Palmer.
E. W. Burgess
Inventor.
Herbert B. Sperry,
By
Atty.

UNITED STATES PATENT OFFICE.

HERBERT B. SPERRY, OF CHICAGO, ILLINOIS, ASSIGNOR TO INTERNATIONAL HARVESTER COMPANY OF NEW JERSEY, A CORPORATION OF NEW JERSEY.

SHEAF-CARRIER.

1,200,042.

Specification of Letters Patent.

Patented Oct. 3, 1916.

Application filed May 11, 1914. Serial No. 837,666.

*To all whom it may concern:*

Be it known that I, HERBERT B. SPERRY, a citizen of the United States, residing at Chicago, in the county of Cook and State of Illinois, have invented certain new and useful Improvements in Sheaf-Carriers, of which the following is a full, clear, and exact specification.

My invention relates to sheaf carriers, and in particular to means operatively connected with the power transmitting mechanism of a harvester and its sheaf carrier in a manner to cause the carried to dump its load at predetermined intervals controlled by the distance of travel of the machine.

The object of the invention is to provide means for automatically actuating the carrier in a manner to dump an accumulated load and to return the carrier to its sheaf receiving position regardless of the number of sheaves received, and manually controlled means operative to suspend the automatic action of the carrier controlling mechanism or to cause it to dump its load at any instant, at the will of the operator. These objects are attained by means of mechanism one embodiment of which is illustrated in the accompanying drawings, in which—

Figure 1 is a top plan view of a sheaf carrier and part of a harvester having the carrier attached thereto and having my invention forming a part thereof; Fig. 2 is a detached detail of part of the automatic mechanism for operating the carrier; Fig. 3 is a view in perspective of an assemblage of parts of the carrier operating mechanism; Fig. 4 is a vertical cross section on an enlarged scale of Fig. 3 along line A—B; Fig. 5 is a cross section of Fig. 3 along line C—D; Fig. 6 is a view similar to Fig. 5 and designed to illustrate the operation of part of the sheaf carrier actuating mechanism; Fig. 7 is a side elevation, partly in section, designed to illustrate the manner of connecting the sheaf carrier actuating mechanism with an operative part of a harvester; Fig. 8 is an end elevation of a worm wheel and sleeve forming part of the carrier actuating mechanism as shown in Fig. 3; Fig. 9 is a bottom plan view of Fig. 8; Fig. 10 is a side elevation of a pawl carrying wheel forming part of Fig. 3; Fig. 11 is a bottom view of Fig. 10; Fig. 12 is a side elevation of a ratchet wheel forming part of Fig. 3; Fig. 13 is a bottom view of Fig. 12; Fig. 14 is a side elevation of a toothed set wheel designed to control the periodicity of the operation of the carrier dumping mechanism; Fig. 15 is a bottom view of Fig. 14; Fig. 16 is a plan view of part of the setting mechanism coöperating with the set wheel, as shown by dotted lines in Fig. 4; and Fig. 17 is a side view of Fig. 16.

Referring to the drawings, wherein the same reference numerals designate like parts throughout the several views, the wheel frame of the harvester is represented by 1, and includes longitudinally disposed frame members 2 and 3 upon the stubbleward and grainward sides, respectively, of the traction wheel 4, 5 the rear frame member, and 6 the seat supporting pipe.

7 represents a cross shaft journaled in bearings carried by the wheel frame in rear of the traction wheel, and operatively connected with the traction wheel by means of sprocket wheels 8 and 9 carried by the cross shaft and traction wheel, respectively, and the sprocket chain 10.

11 represents the harvester crank shaft journaled in bearings carried by the wheel frame 1 upon the stubbleward side of the traction wheel, and having a pinion 12 secured thereto that meshes with a bevel gear wheel 13 secured to the cross shaft 7.

14 represents a gear carrying bracket secured to the wheel frame member 2 by means of a U-shaped clamping member 16 and having transversely disposed sleeves 17 and 18 integral therewith at the front and rear ends thereof, respectively.

Secured to the crank shaft 11 is a worm carrying sleeve 19, preferably made in two parts, whereby it may be conveniently secured to the shaft 11 by means of bolts 20, and having separate worms 21 and 22 at the front and rear ends thereof, respectively.

23 represents a worm wheel operatively engaging the worm 21, and having integral therewith a sleeve 24 journaled in the sleeve 17, and 25 represents a ratchet toothed wheel secured to the end of the sleeve, preferably by a threaded connection.

26 represents a shaft journaled in the sleeve 24 and having a universal coupling member 27 secured to its stubbleward end. Secured to the shaft 26 is a wheel 28, having a laterally extending peripheral rim 29 provided with a gap 30, and 31 represents a pawl member pivotally mounted upon the wheel 28 eccentric to its axis, and having a peripheral laterally extending rim 32 provided with a radially extending tooth 33. The pawl member 31 is in the form of a ring, and its radial web is slidably received by a laterally extending hook member 34 integral with the wheel 28 and preferably located within the gap 30. The web of the pawl member is provided with a gap 35, the end walls of which are adapted to engage with the hook member 34 in a manner to limit a swinging movement of the pawl member in opposite directions. The pawl member 31 is adapted to swing about its axis in a direction to cause an inwardly extending tooth $31^1$ integral therewith to engage with the ratchet wheel 25, or to be disengaged therefrom. A curved spring $35^1$, having one end connected with the pawl and its opposite end with the wheel 28, is operative in a manner to normally throw the pawl in engagement with the ratchet toothed wheel 25. Loosely mounted upon the shaft 26, upon the opposite side of the wheel 28, is a toothed wheel, 36, having a laterally extending wing 37 that overlaps the rim 29 of wheel 28 and contacts with a laterally extending stop member 38 integral with a crown toothed set member 39 loosely mounted upon the shaft 26, and 40 represents a vertically disposed bar having an opening intermediate its ends that receives the end of the shaft 26, the lower end of the bar engaging with a laterally extending plate member $40^1$ secured to the lower side of the bracket member 14 in a manner to secure it against a turning movement upon the shaft, and its opposite end turned laterally and provided with an opening that receives a pin 41 that engages with the teeth of the set wheel member 39 in a manner to secure the set member in any desired position of angular adjustment upon the shaft 26.

42 represents a torsional spring coiled around the hub 43 of the toothed wheel 36, having one end secured to said wheel and its opposite end passed through a semicircular concentric slot 44 in the set member 39 and secured to the bar 40, the spring being operative to turn the wheel 36 in a direction to cause the wing 37 to engage with the stop member 38 of the set member 39 and to yieldingly resist an angular movement of the toothed wheel in an opposite direction.

45 represents a worm wheel secured to one end of a shaft 46 and meshing with the worm 22, said shaft being journaled in the sleeve 18 and having secured to its opposite end an eccentric 47, and 48 represents a reciprocating pawl member having one end mounted upon the eccentric and its opposite free end adapted to successively engage with the teeth upon the wheel 36 as the shaft 46 rotates.

49 represents a gravity dog having an opening at one end that loosely receives the extended end of the shaft 46, and the opposite free end of the dog is adapted to engage the teeth of the wheel 36 in a manner to normally prevent a rotative movement of the wheel in a direction opposite that as actuated by the reciprocating pawl 48.

50 represents a latch member having one end loosely mounted upon the shaft 46, upon the opposite side of the eccentric 47, and its opposite end provided with a hook 51 that engages with the radial tooth 33 of the pawl member 31 in a manner to normally hold the pawl from engaging with the ratchet toothed wheel 25.

Secured to the shaft 26, adjacent the worm wheel 23, is a scroll cam member 52, with which a roller 53 engages, the roller being journaled upon one end of a rod 54, slidably mounted in bearing members 56 secured to a bracket 55 carried by the extended ends of the shafts 26 and 46.

57 represents a coiled compression spring encircling the rod 54 and operative between a pin 58 through the rod and one of the bearings 56 in a manner to yieldingly hold the roller 53 in contact with the scroll cam 52, the cam being provided with a radially disposed shoulder 59 with which the roller engages in a manner to prevent a rotative movement of the cam in one direction.

60 represents a sheaf carrier supported by the wheel frame 1, and including swinging fingers 61 supported by a bar 62 and controlled by a longitudinally movable bar 63 in a well-known way to cause the fingers to swing rearwardly and downwardly to a folded and trailing position upon the ground in dumping an accumulated load, and to be returned to an operative position to receive the sheaves. For the purpose of actuating the carrier automatically I provide a link member 64, having one end connected with the bar 63 and its opposite end with a crank arm 65 integral with a shaft 66 journaled upon a fixed part of the carrier supporting mechanism, and operatively connected with the universal coupling member 27. When the carrier is in a sheaf receiving position the roller 53 is in engagement with the shoulder 59 of the scroll cam member 52 and thereby retains the carrier in its receiving position, whereas otherwise the weight of the accumulated load would cause the carrier to be moved toward its dumping position.

In operation the crank shaft 11 of the harvester is given continuous rotation by the advance of the machine and, through the worms 21 and 22 secured thereto, imparts continuous rotative movement to the worm wheel 23 and the ratchet toothed wheel 25 secured to the sleeve 24 and to the worm wheel 45, the shaft 46 and the eccentric 47. The rotative movement of the eccentric 47 imparts a reciprocatory movement to the pawl member 48 that successively engages with the teeth of the wheel 36 and thereby imparts a step by step rotative movement thereto against the tension of the spring 42, and the gravity dog 49 engages successively with the teeth as the wheel is turned and prevents a return movement thereof as the pawl 48 reciprocates, the wheel carrying around with it the wing member 37. When the wing 37 passes the position shown in Fig. 5 it disengages the latch member 50 from the tooth 33 of the pawl member 31, as shown in Fig. 6, and the spring 35¹ swings the pawl into engagement with the ratchet toothed wheel 25 and thereby a rotative movement is imparted to the shafts 26 and 66. The crank arm 65 and the link connection 64 to the controlling bar 63 of the sheaf carrier move the bar in a direction to dump the accumulated load, and then in a direction to return the carrier to its sheaf receiving position. The end wall of the gap 35 of the pawl member 31 engages with the hook member 34 of the wheel 28 and carries the gap 30 beyond the path of movement of the pawl 48, and the gravity dog 49 and the rim 29 at the end of the gap lifts the pawl 48 and dog 49 to a plane preventing their engagement with the toothed wheel 36, and when the pawl and dog are released the spring 42 immediately returns the wheel 36 to its original position with the wing 37 contacting with the stop member 38 upon the set member 39 at the end of the cycle of movement of the dumping mechanism. The set member 39 is designed to be adjustable angularly to vary the intermittent action of the carrier dumping mechanism according to the distance traveled by the harvester and the desired distance apart of the rows of dumped sheaves, the mechanism being operative to maintain the rows of discharged sheaves in such parallel relation regardless of the number dropped by the carrier controlling mechanism at each cycle of its movement.

In the operation of the device it is desirable that means be provided whereby the automatic action of the mechanism may be temporarily suspended at the will of the operator, as when the machine would be turning at the corners of the field and the row would be in the path of the team or other propelling means, and it would be necessary to carry the load beyond one row and dump it at the next and to permit the mechanism to resume its automatic operation when such suspending means was released. The means provided for attaining this result include a foot treadle 67 pivotally mounted upon the seat supporting member 6 and having a laterally extending crank arm 68 pivotally connected with the front end of a link 69, the rear end of said link being pivotally connected with a crank arm 70 integral with one end of a diagonally disposed crank shaft 71 journaled upon the frame of the harvester, its rear end in a bearing 72 and its front end in a bearing 73 and provided with a crank portion 74 near its opposite end that is connected with the front end of the gravity dog 49 by means of a link 75. When the operator manipulates the foot treadle and rocks the shaft to a position shown by dotted lines in Fig. 1, the link 75 swings the gravity dog 49 about its axis and disengages it from the toothed wheel 36, and while it is held disengaged the pawl 48 will not successively engage the teeth upon the wheel 36 in a manner to advance it, and consequently the cycle of operative operation of the automatic mechanism is suspended until the operator releases the foot treadle and permits the torsional spring 76, carried by the shaft and operative between a fixed part of the frame structure and the shaft, to turn it to its initial position. Means are also provided whereby the operator may cause the mechanism to operate to dump a load from the carrier at will, comprising a pawl arm 77 integral with the front end of the rock shaft 71 and disposed beyond the bearing 73.

78 represents a link slidably received by an opening in a fixed part 79 of the frame structure, having one end pivotally connected with the free end of the latch member 50 and its opposite end provided with a notch 80 adapted to be engaged by the front end of the pawl arm 77 when the shaft 71 is released by the operator and permit it, under the torsional force of the spring 76, to return to its normal position, the pawl becoming disengaged from the notch when the shaft has been given a predetermined degree of angular movement, as shown in Fig. 2. When the operator swings the foot treadle forward the action of the automatic mechanism is suspended, and will remain suspended until the treadle is released and the rock shaft permitted to return to its normal position, and while returning it trips the latch member 50 and the load is immediately dumped and the automatic mechanism resumes its regular cycle of operation.

Having shown and described a preferred form of my invention, I do not wish that it be confined to the specific details of construction as illustrated and described, it being understood that many changes may be made both in the form and proportion of the parts without departing from the spirit of my invention.

What I claim as my invention, and desire to secure by Letters Patent, is:

1. In a sheaf carrier actuating mechanism for harvesters, a sheaf carrier, two constantly rotatable gear members deriving motion from the harvester, a gear member deriving a step by step movement from one of said constantly rotating members, a rotatable shaft operatively connected with said carrier, a clutch mechanism connecting said shaft with said remaining constantly rotatable gear member, a clutch tripping mechanism, said clutch tripping mechanism being controlled by the step by step movable gear member whereby the interval between the dumping operations of the carrier is controlled by the distance of advance of the harvester.

2. In a sheaf carrier actuating mechanism for harvesters, a sheaf carrier attachment, means for automatically actuating said carrier to dump an accumulated load, said means including a gear supporting member secured to the frame of the harvester, a constantly rotatable gear member journaled upon said supporting member and deriving motion from an operative part of the harvester, a crank shaft journaled in said gear supporting member and operatively connected with said carrier, a constantly rotatable clutch member journaled upon said shaft, a clutch mechanism connecting it therewith, a toothed wheel journaled upon said shaft deriving a step by step rotatable movement from said constantly rotatable gear member, clutch tripping mechanism movable with said wheel and adapted to trip said clutch mechanism into action when said wheel has been given a predetermined angular movement, and means controlling the degree of angular movement of said wheel.

3. In a sheaf carrier actuating mechanism for harvesters, a sheaf carrier attachment, means for automatically actuating said carrier to dump an accumulated load, said means including a gear supporting member secured to the frame of the harvester, a constantly rotatable gear member journaled upon said supporting member and deriving motion from an operative part of the harvester, a crank shaft journaled in said gear supporting member and operatively connected with said carrier, a constantly rotatable clutch member journaled upon said shaft, a clutch mechanism connecting it therewith, a toothed wheel journaled upon said shaft deriving a step by step rotatable movement from said constantly rotatable gear member, clutch tripping mechanism movable with said wheel and adapted to trip said clutch mechanism into action when said wheel has been given a predetermined angular movement, and a set member controlling the degree of angular movement of said wheel according to the distance of travel of the harvester.

4. In a sheaf carrier actuating mechanism for harvesters, a sheaf carrier attachment, means for automatically actuating said carrier to dump an accumulated load at predetermined intervals, said means including a gear supporting member secured to the frame of the harvester and including laterally extending journal sleeves at opposite sides thereof, shafts journaled in said sleeve, one of said shafts deriving constant rotative movement from said harvester and the remaining shaft intermittent rotative movement and operatively connected with said carrier, and means controlling an intermittent action of said shaft, and actuated by said constantly rotating shaft, said means being governed by the distance traveled by said harvester.

5. In a sheaf carrier actuating mechanism for harvesters, a sheaf carrier attachment, means for automatically actuating said carrier to dump an accumulated load at predetermined intervals, said means including a gear supporting member secured to the frame of the harvester and including laterally extending journal sleeves at opposite sides thereof, shafts journaled in said sleeves, one of said shafts deriving constant rotative movement from said harvester and the remaining shaft intermittent rotative movement and operatively connected with said carrier, and means controlling an intermittent action of said shaft, said means including an eccentric secured to said constantly rotatable shaft, a reciprocating pawl actuated by said eccentric, a constantly rotatable clutch member journaled upon said intermittently rotatable shaft, and means for causing it to give a rotative movement thereto, said means including a toothed wheel journaled upon said shaft and given a step by step rotative movement by said reciprocating pawl, a clutch tripping member carried by said wheel, a pawl forming part of said clutch mechanism and adapted to engage with said constantly rotatable clutch member, the operation of said pawl being controlled by said clutch tripping member.

6. In a sheaf carrier actuating mechanism for harvesters, a sheaf carrier attachment, means for automatically actuating said carrier to dump an accumulated load at predetermined intervals, said means including a gear supporting member secured to the frame of the harvester, a shaft journaled in said frame and deriving constant rotative movement from the harvester, a second shaft journaled in said frame and operatively connected with said carrier, said second shaft deriving intermittent rotative movement from the harvester through means including a clutch mechanism, the operation of said clutch mechanism being controlled by said constantly rotating shaft whereby the intermittent action of said second shaft is regulated by the distance of advance of the harvester.

In testimony whereof I affix my signature, in the presence of two witnesses.

HERBERT B. SPERRY.

Witnesses:
CHARLES H. BURNS,
ALBERT L. SPECHT.

Copies of this patent may be obtained for five cents each, by addressing the "Commissioner of Patents, Washington, D. C."